Figure 1:
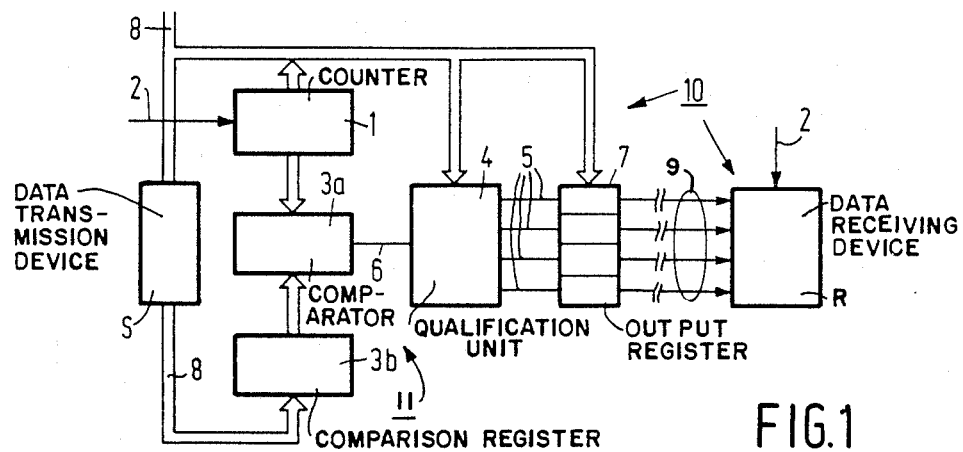

United States Patent [19]

Van Veldhuizen

[11] Patent Number: 4,756,013
[45] Date of Patent: Jul. 5, 1988

[54] MULTI-FUNCTION COUNTER/TIMER AND COMPUTER SYSTEM EMBODYING THE SAME

[75] Inventor: Evert D. Van Veldhuizen, Eindhoven, Netherlands

[73] Assignee: U.S. Philips Corporation, New York, N.Y.

[21] Appl. No.: 855,525

[22] Filed: Apr. 23, 1986

[30] Foreign Application Priority Data

Apr. 26, 1985 [NL] Netherlands .................... 8501202

[51] Int. Cl.⁴ .................... H03K 21/40; G11C 7/00
[52] U.S. Cl. .................... 377/39; 377/52; 377/72
[58] Field of Search .................... 377/39, 73, 75, 81, 377/52, 70

[56] References Cited

U.S. PATENT DOCUMENTS 4,284,953 8/1981 Hepworth et al. .................... 377/75
4,284,979 8/1981 Flanders et al. .................... 377/39
4,420,814 12/1983 Arikawa et al. .................... 377/39
4,443,765 4/1984 Findeisen et al. .................... 377/81
4,495,628 1/1985 Zasio .................... 377/73
4,517,684 5/1985 Fennel .................... 377/39

Primary Examiner—John S. Heyman
Attorney, Agent, or Firm—James J. Cannon

[57] ABSTRACT

A programmable counter/timer is responsive to signals on a data line for producing signals on one or more output lines and includes a counter connected to the data line, a comparator connected to said counter for producing a control signal when said counter reaches a stored preselected value, and a qualification unit connected to the comparator, the qualification unit having a register for storing a logic state. The qualification unit is responsive to the control signal and the stored logic state for generating a signal on selected output lines when the counter reaches the predetermined stored value.

19 Claims, 2 Drawing Sheets

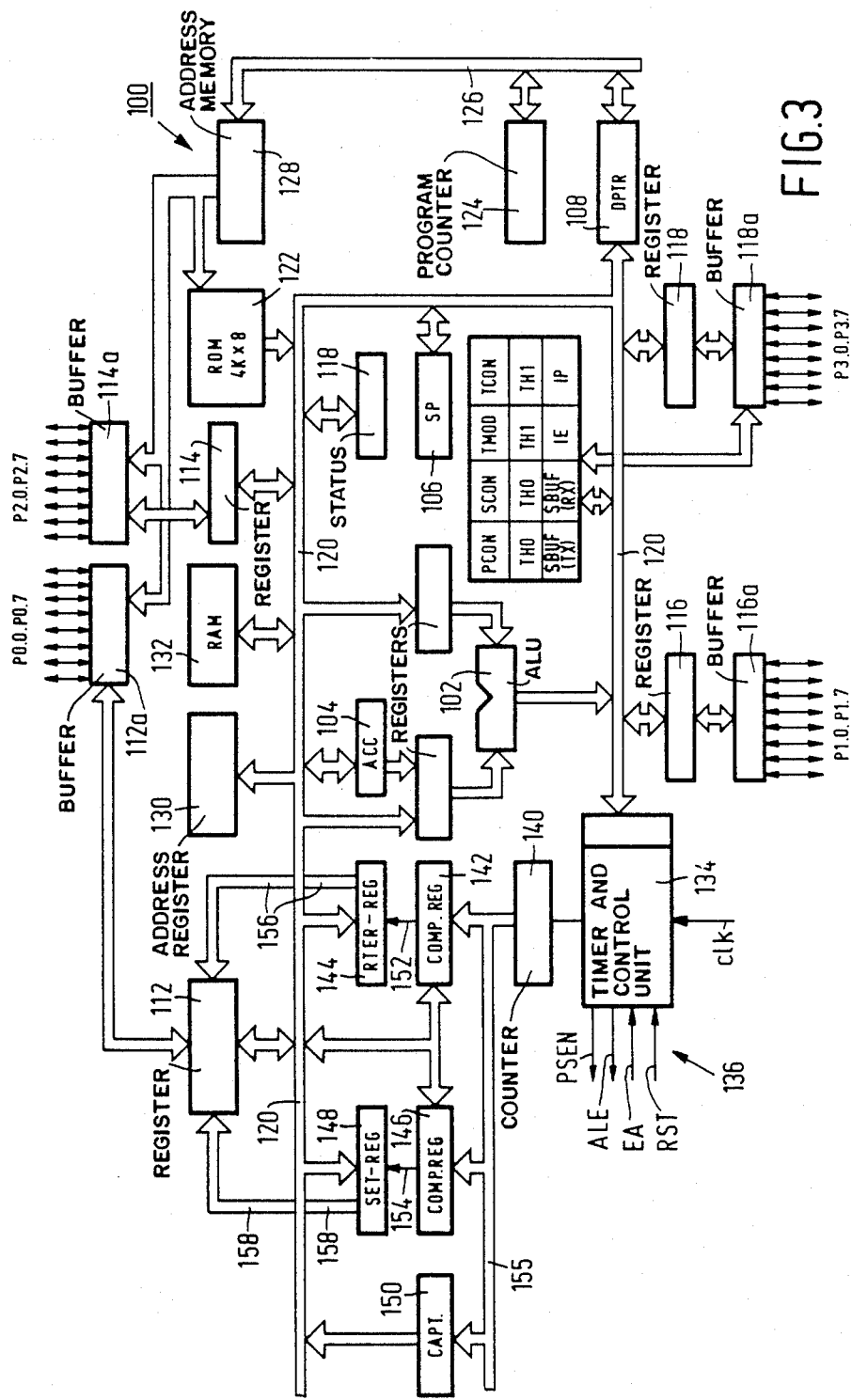

MULTI-FUNCTION COUNTER/TIMER AND COMPUTER SYSTEM EMBODYING THE SAME

The invention relates to a data source system with a data source circuit which includes a counter and a comparator unit with a control signal output on which a control signal is generated when the counter reaches a counter value which is stored in the comparator unit.

The invention also relates to a programmable processor for digital signal processing which includes an arithmetic and logic unit, a program memory, several registers and communication means in the form of input and output registers, and bus connection means for connecting said components to one another and to the environment.

The invention also relates to data source circuits and programmable microprocessors including data source circuits, integrated on a semiconductor substrate.

In digital data source systems including processors and control units, it is often necessary to control data lines or internal bus lines in dependence of the value of a counter. This counter counts, for example clock pulses (timer) or external input pulses (event counter). The counter value in which a signal must be supplied on the line is laid down in a comparison register. A comparator circuit compares the value of the counter with the content of the register. When correspondence is detected, a signal is supplied whereby, for example the value of an output register is changed or an interrupt is generated. For each line to be controlled in this manner, a register and a comparator circuit must thus be provided.

In order to reduce the number of comparator circuits for a given number of lines to be controlled, a solution can be used as in the Intel microcontroller 8096 (described in Electronic Design, Aug. 5, 1982, pages 165–173). Therein, use is made of one comparator and a content addressable memory for defining the given counter value and the associated lines to be controlled. To this end, outputs of the content addressable memory are connected to an output circuit which also receives the output signal of the comparator. Upon reception of the output signal of the comparator, the output circuit utilizes the command field of the content addressable memory for controlling the output lines. Such a solution satisfies the requirements imposed: (simultaneously) controlling a number of output lines at an exactly defined instant and using only one comparator unit; however this solution is comparatively expensive, which is of course a drawback.

It is the object of the invention to provide a data source system including a data source circuit or programmable processor which enables the control of a desired number of data lines in dependence of different counter values (with a high repitition rate and simultaneously), which utilizes only one comparator unit, and which is still inexpensive.

To achieve this, a data source system in accordance with the invention is characterized in that there is provided at least one qualification unit which is first set to a given logic state and which generates a signal on one or more data lines in reaction to the occurrence of said control signal and in dependence of the logic state. A data source system in accordance with the invention offers the advantage that a given logic state is stored in the qualification unit and the associated counter value (=the associated instant) is stored in the comparator unit, which means that the means having generated and/or supplied or stored the logic state and the associated counter value become available again for determining, storing or supplying a next logic state and the associated instant or for other operations.

A preferred embodiment of a data source system in accordance with the invention is characterized in that the qualification unit includes a number of flipflops and a corresponding number of logic gates, an output of a flipflop being connected to an input of an associated logic gate, a further input thereof being connected to the output of the comparator unit, the outputs of the gates controlling the data lines.

The data source system in accordance with the invention enables the control of several lines by means of one comparison register and one comparator, in dependence of different counter values. For this purpose there is added a qualification unit which includes at least one flipflop for each line to be controlled. The state of this flipflop determines whether the associated line will be controlled or not by the comparator result. When the comparison register is loaded, thus determining the counter value in which a signal is supplied, the qualification unit is also loaded, thus determining which line or lines will receive this signal.

A programmable processor for a data source system in accordance with the invention is characterized in that it includes a data source circuit which includes a counter and a comparator unit with a control signal output on which a control signal is generated when the counter reaches a counter value which is stored in the comparator unit, there being provided at least one qualification unit which is first set to a given logic state and which generates a signal on one or more outgoing lines in reaction to the occurrence of said control signal and in dependence of the logic state. Such a processor offers the advantage that, after the loading of a given logic state and the counter value, the processor can perform further operations without having to exert a further effect on the instant of control of the various output lines and also without being disturbed thereby.

A preferred embodiment of a processor in accordance with the invention is characterized in that inputs of the comparator unit and of the qualification unit are connected to the bus connection means. The advantage of such a processor consists in that the bus connection means of the processor are not required for controlling the output lines and hence the the output register, which means that they are available for other uses (ALU, registers etc.).

Figure 2:
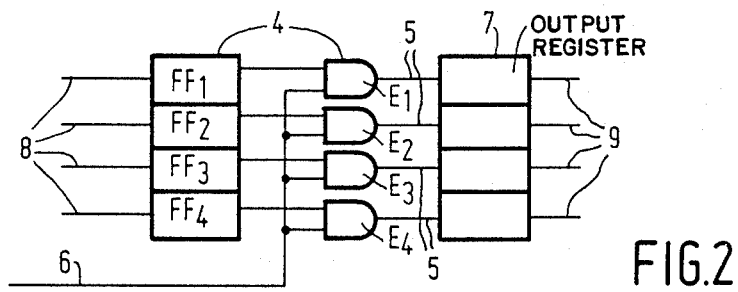
Figure 4:
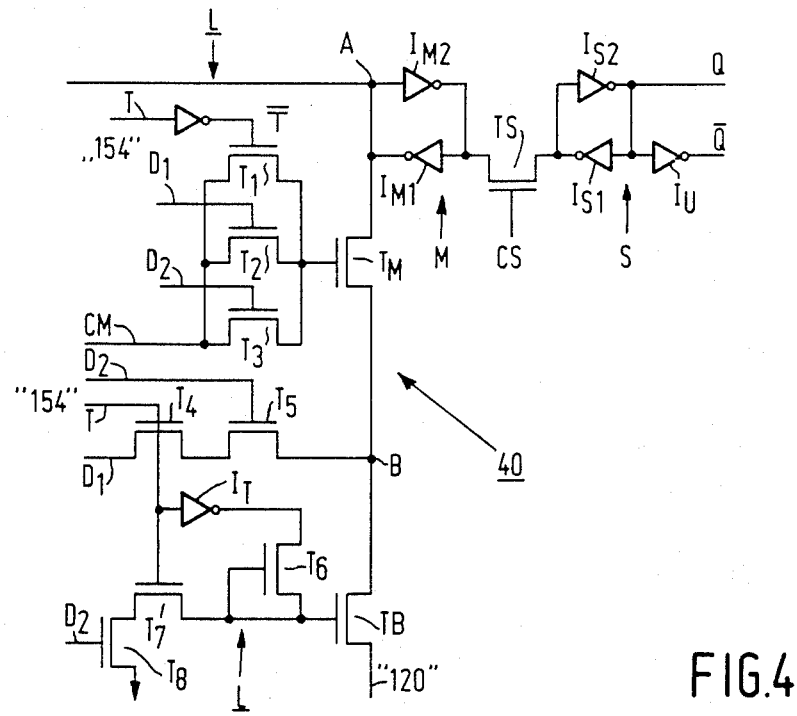

Embodiments in accordance with the invention will be described in detail hereafter with reference to the drawing; therein:

FIG. 1 shows a block diagram of a data source system including an (integrated) data source circuit in accordance with the invention, FIG. 2 shows an embodiment of a part of a data source circuit as shown in FIG. 1, FIG. 3 shows an embodiment of a programmable processor for a data source system, and FIG. 4 shows a detail of the processor shown in FIG. 3.

The data source system 10 in accordance with the invention which is shown in FIG. 1 includes a data transmission device 5, at least one data source circuit 11, bus connection means 8, data lines 9, and data receiving devices R. The data source circuit 11 includes a counter 1, at least one comparator unit 3a, 3b a qualification circuit 4, output lines 5 and an output register 7. The counter 1 is a ring counter which receives counting pulses on its input 2. The value of the counter is incremented or decremented by one in reaction to each counting pulse. When the maximum or the minimum position is reached, the counter 1 rolls over to the minimum or the maximum, position, respectively.

The comparator unit includes a comparator 3a and a comparison register 3b. The qualification unit 4 determines which line 5 will conduct the signal on output 6 of the comparator. In the present embodiment the output lines 5 control the inputs of the output register 7. However, the signals on the lines 5 may also be used for other control purposes.

The comparison register 3b as well as the qualification unit 4 can be loaded via the bidirectional bus 8. Furthermore, the counter can be read via the bus 8. The output register 7 can be loaded not only via the lines 5, but also via the bus 8. The necessary addressing lines have been ommitted in the Figure for the sake of clarity. When the counter 1 reaches a value which is stored in the comparison register 3b, the comparator 3a generates a signal on the output 6. Via the qualification unit 4, this signal is applied to some lines 5. The lines 5 which receive this signal are determined by the position of the qualification unit 4.

The lines 5 are connected to inputs of the output register 7. These inputs may be set inputs, reset inputs or modification inputs. Outputs of the register 7 are connected to receiving devices R via data lines 9.

As appears from FIG. 2, the qualification unit 4 may be composed of a number of flipflops FF1, FF2, ... FF4 and a corresponding number of AND-gates E1, E2, ... E4. The inputs of the flipflops are connected to the bus 8. The output of each flipflop is connected to an input of an associated AND-gate. The second input of each AND-gate is connected to the output of the comparator 3b. The flipflops FF1, FF2, ..., FF4 of the qualification unit can be set to a desired state, thus determining which of the AND-gates E1, E2, ... E4 will conduct the signal of the comparator 3b as soon as this signal appears.

It will be apparent that the data source circuit 11 shown in FIG. 1 is preferably integrated on a substrate. The circuit 11 is preferably used in conjunction with a known (programmable) processor, in a data source system 10.

FIG. 3 shows a block diagram of a programmable processor 100 in accordance with the invention which includes as usual an arithmetic and logic unit 102, some special function registers such as inter alia an accumulator 104, a stack pointer 106, a data pointer 108, a B-register 110 which is used for multiplications, four input-/output registers 112, 114, 116 and 118, and internal bus connection means 120 which interconnect said components, thus enabling communication with the environment. The processor 100 furthermore includes a program memory 122, a program counter 124 which is connected to a program address memory 128 via an address bus 126, a further address register 130 and a random access memory 132 (SRAM). It will be apparent that the processor 100 also includes a timer and control unit 134 which on the one hand is connected to the internal bus 120 and on the other hand includes inputs and outputs 136 from and to the environment. Each of the input and output registers 112, 114, 116 and 118 has access to and is accessible from the environment via respective buffer circuits 112a, 114a, 116a and 118a.

The processor 100 in accordance with the invention also includes a data source system with a counter 140, at least one comparator unit 142 and a qualification unit 144. In the embodiment shown in FIG. 3, the processor 100 includes a second data source circuit, in which same counter 140 is used, further including a second comparator unit 146 and a second qualification unit 148, and a time register 150. The operation of the components 140 to 150 of the processor 100 in accordance with the invention can be summarized as follows: each of the qualification units 144, 148 and the comparator units 142, 146 can be loaded via the internal bus 120. The counter 140 receives pulses from the timer and control unit 134. The counter 140 is a ring counter which counts from zero to a maximum value and which rolls over to zero in reaction to a next counting pulse, thus generating an overflow signal. The comparator unit 142, 146 compares its contents with the value of the counter 140 and applies a control signal to the qualification units 144, 148, via the connection 152, 154, said qualification units subsequently transferring their contents to the output register 112 via a direct connection 156, 158. As a result of the addition of the qualification units 144, 148, the comparator units 142, 146 and the counter 140 to the known parts of the processor 100, a quantity of data can be applied from the processor 100 to the environment at an exactly defined (software-determined) instant, without the internal bus 120, the ALU 102, said special registers etc. being required and without their operation being inhibited thereby. It is an advantage that a new instant or new data can already be determined for immediate use for the control of the devices controlled by the processor 100.

It will be apparent that the processor 100 shown in FIG. 3 is preferably integrated on a semiconductor substrate. The qualification units 144, 148, the comparator units 142, 146, the counter 140 and the output register 112 shown in FIG. 3 can be constructed as described with reference to the FIGS. 1 and 2. It follows from the foregoing that each qualification unit 144, 148 is capable of controlling a respective output register which may include a number of toggle flipflop circuits for this purpose. However, in FIG. 3 the output register 112 is connected to both qualification units 144, 148 via output lines 156, 158. Such a setup can be used for setting various R-S flipflop circuits of the output register 112 to a set state (logic 1) by one qualification unit (144) and for resetting these circuits (logic 0) by the other qualification unit 148.

As appears from FIG. 3, the output register 112 is also connected to the bus 120, thus enabling writing and reading of the register 112 by software. In FIG. 4 is illustrated an example of one flipflop 40 of the output register 112. The flipflop 40 includes a master section M and a slave section S, each of which includes two end-around coupled inverters $I_{M1}$, $I_{M2}$, $I_{S1}$, $I_{S2}$. The output of the invertor $I_{S2}$ is connected to a first output Q of the flipflop 40 and the output of a further invertor $I_n$, being connected to the output Q, forms the inverted output $\overline{Q}$ of the flipflop 40. The flipflop 40 also includes a further input TEST which is connected to an input junction A and wherefrom, regardless of further control signals, test signals can be applied to the flipflop 40 and also, for example a "power on clear" signal which brings the flipflop 40 in a desired initial logic state when the power for the processor 100 is switched on (see FIG. 3).

The outputs $D_1$ and $D_2$ of two flipflops of the qualification unit 144 are connected to inputs of a logic gate L, the output of which controls the flipflop 40. The logic gate L also receives a time control signal T which is generated by the comparator unit 146 on the connection 154 (see FIG. 3). The operation of the flipflop 40 is controlled by clock pulses CM (clock pulses for the master section M) and SM (clock pulses for the slave section S). The clock pulses CS turn on the transistor TS and enable the slave section S to assume the logic state of the master section M. The clock CM controls the transistor TM so that the logic state at the point B is transferred to the master section M. The logic gate L shown controls the flipflop 40 as follows by means of the signals T, D1 and D2:

When the comparator output signal T is "low", the signals D1 and D2 have no effect on the flipflop 40. When the signal T is "high", the signals D1 and D2 have the effect stated in the following table:

| Situation | T | D1 | D2 | logic state in flipflop 40 |
|---|---|---|---|---|
| 1 | high | low | low | may not change |
| 2 | high | high | low | assumes state of "120" |
| 3 | high | low | high | becomes low |
| 4 | high | high | high | becomes high |

Situation 1 is realised by means of three parallel connected transistors T1, T2 and T3 via which the clock pulses CM are applied to the transistor TM. The clock pulses CM are not "conducted" only if the signals D1, D2 and $\overline{T}$ are all low. The signals D1 and D2, therefore, have an effect only when the comparator signal T is "high". The inverse signal $\overline{T}$ is obtained in known manner by inversion of the signal T via an inverter $I_{T1}$. The situations 3 and 4 are realized by means of two series connected transistors T4 and T5 which receive the signals D2 and T on their gate electrodes. The signal D1 is applied to a main electrode (drain). Depending on the logic state (high or low) of the signal D1, the junction B becomes logic high or low, provided that the transistors T4 and T5 are both turned on. The logic state of the junction B is taken over by the flipflop 40 as soon as the transistor TM is turned on.

Situation 2 should occur when the signals T, D1 and D2 are high, high and low, respectively. The transistor TB must then be turned on. However, when the signals D1 and D2 may not have an effect on the flipflop 40 (signal T is low), the flipflop 40 must remain accessible for data on the bus 120. Therefore, the transistor TB must be turned on. The forgoing implies that the transistor TB need be turned off only in the situations 1, 3 and 4. When the signal T is low, a "high" signal is applied, via the invertor $I_{T2}$, to the gate electrode of the transistor TB, via the transistor T6 which is connected as a diode (it is to be noted that the output of the invertor $I_{T1}$ can also be used; however, this has been ommitted for the sake of clarity of the Figure). The signal T is applied to the transistor T7 and the signal D2 is applied to the transistor T8. The transistor TB will be turned off when the signals T and D2 are high, regardless of the state of the signal D1. Furthermore, the transistor TB will not be turned off when the signal T is high and the signal D1 as well as the signal D2 is low (situation 1), because the signals $\overline{T}$, D1 and D2 are applied to the transistors T1, T2 and T3, respectively. The transistors T1, T2 and T3 are turned off in the situation 1, so that the transistor TM does not receive a clock pulse (pulses) CM and hence is turned off and the logic state of the flipflop 40 is not changed.

Instead of the circuit 40 in FIG. 4a the following simpler solution can be used. The outputs D1 and D2 are connected to a J and K input respectively of a (positive) edge triggered JK flipflop. The signal of the comparator unit 154 (or 152) is then fed into the clock-input of the JK flipflop. The output of the JK flipflop is fed to the input register 112. Such a circuit gives the possibilities listed in the following table:

| Situation | D1 | D2 | "154" | logic output of FF. |
|---|---|---|---|---|
| 1 | 0 | 0 | ↑ | no change |
| 2 | 0 | 1 | ↑ | High |
| 3 | 1 | 0 | ↑ | High |
| 4 | 1 | 1 | ↑ | Toggle |

The above simple solution can be used if the information on the one hand from bus 120 or from registers 144 and 148 (and thus from comparators 142 and 146) is send to the register 112 at differend timeslots as it is known at which moment of the cycle time the comparators 142 of 144 may generate a positive edge. So at further instances (not interfering) register 112 may be written or read under control of software.

The detail of the processor 100 of FIG. 3 described above is merely an example. It will be apparent that many alternatives are feasible.

What is claimed is:

1. A programmable counter/timer responsive to signals on a data line for producing output signals on two or more output lines comprising:
   a counter connectable to the data line;
   a comparator unit connected to said counter for producing a control signal when said counter reaches a preselected value;
   a qualification unit connected to said comparator unit and said two or more output lines, said qualification unit including plural means for storing a plurality of logic states in response to said data line for generating a signal on selected ones of said output lines in response to said control signal when said counter reaches said predetermined value.

2. The counter/timer of claim 1 wherein said qualification unit comprises a plurality of flip flops and a corresponding plurality of logic gates, each logic gate having a first input connected to an output of one of said plurality of flip flops and a second input connected to the output of said comparator, the outputs of said plurality of logic gates connected to said one or more output lines.

3. The counter/timer of claim 2 wherein said logic gates comprise AND-gates.

4. The counter/timer of claim 1 wherein said comparator unit comprises a comparison register connected to said dataline and a comparator connected to said comparison register.

5. The counter/timer of claim 1 comprising an output register having a plurality of inputs connected to said output lines, the signals on said output lines adapted to set, reset or invert the logic state of said output register.

6. The counter/timer of claim 2 comprising an output register having a plurality of inputs connected to said output lines, the signals on said output lines adapted to set, reset or invert the logic state of said output register.

7. The counter/timer of claim 3 comprising an output register having a plurality of inputs connected to said output lines, the signals on said output lines adapted to set, reset or invert the logic state of said output register.

8. The counter/timer of claim 4 comprising an output register having a plurality of inputs connected to said output lines, the signals on said output lines adapted to set, reset or invert the logic state of said output register.

9. The counter/timer of claim 8 wherein said output register comprises a plurality of output flip flops adapted to be either set to the 1-state or to the 0-state, or inverted from one logic state to the other logic state.

10. The counter/timer of claim 8 wherein said output register comprises a plurality of output flip flops, the qualification unit comprises two flip flops for each of said plurality of output flip flops, the combined states thereof adapted to represent four states: no modification, setting to the 1-state, to the 0-state, or to the inverted logic state of the output flip flop.

11. A counter/timer as claimed in any one of claims 1–10, comprising a second comparator and a second qualification unit connected to said second comparator and responsive to a second control signal generated by said second comparator.

12. The counter/timer of claim 11 in which said qualification unit and said second qualification unit control the same output lines.

13. The counter/timer of claim 11 in which said qualification unit and said second qualification unit control the same output register.

14. The counter/timer of claim 13 wherein said output register comprises a plurality of output flip flops, each of which includes a set input and a reset input, said qualification unit connected to and controlling said set inputs and said second qualification unit connected to and controlling said reset inputs.

15. The counter/timer of claim 11 in which said output register comprises toggle flip flop means having inputs connected to the output lines of the qualification unit.

16. The counter/timer of claim 1 further comprising arithmetic and logic means, program memory, a plurality of registers, and input/output register and bus connection means interconnecting said arithmetic and logic means, program memory, registers, and input/output registers.

17. The apparatus of claim 16 wherein said comparator unit and said qualification unit are connected to said bus means.

18. The apparatus of claim 17 wherein said input/output register is connected to said qualification unit.

19. The apparatus of claim 18 wherein said output register comprises additional inputs connected to said bus means.

* * * * *